United States Patent [19]
Clark

[11] Patent Number: 5,913,389
[45] Date of Patent: Jun. 22, 1999

[54] WHEEL CHOCK

[76] Inventor: Chester L. Clark, 840 County Rd. 115, Ewing, Mo. 63440

[21] Appl. No.: 09/183,737

[22] Filed: Oct. 30, 1998

[51] Int. Cl.⁶ ........................................................ B60T 3/00
[52] U.S. Cl. .............................................. 188/32; 188/4 R
[58] Field of Search ........................ 410/30, 49; 188/4 R, 188/32; 70/226

[56] References Cited

U.S. PATENT DOCUMENTS

| | | | |
|---|---|---|---|
| 2,461,248 | 2/1949 | Wright | 188/32 |
| 2,522,328 | 9/1950 | Wiswell et al. | 188/32 |
| 2,771,162 | 11/1956 | Marsh | 188/32 |
| 3,120,292 | 2/1964 | Rambat | 188/32 |
| 3,811,536 | 5/1974 | Haynes | 188/32 |
| 4,649,724 | 3/1987 | Raine | 188/32 |
| 4,711,325 | 12/1987 | Mountz | 188/32 |
| 4,854,790 | 8/1989 | Andre | 410/30 |
| 5,427,210 | 6/1995 | Willaford | 188/32 |
| 5,490,582 | 2/1996 | Trowbridge | 188/32 |
| 5,586,849 | 12/1996 | Kissel et al. | 410/10 |

*Primary Examiner*—Chris Schwartz
*Attorney, Agent, or Firm*—Philip L. Bateman

[57] ABSTRACT

A wheel chock contains a first wheel-restraining member, a frame with a gear rack attached to the first wheel-restraining member, a second wheel-restraining member, a gear assembly attached to the second wheel-restraining member, and an elongated handle member. The gear assembly has a gear housing with an opening through which the frame passes and also has a releasably ratcheting pinion gear that engages the gear rack. A user holding the handle member from a standing position can restrain a wheel by moving the wheel chock into position on the wheel and then reducing the distance between the first and second wheel-restraining members so they touch the wheel, and can release the wheel by increasing the distance between the first and second wheel-restraining members and then removing the wheel chock.

10 Claims, 3 Drawing Sheets

WHEEL CHOCK

FIELD OF THE INVENTION

This invention relates to wheel chocks for restraining the movement of wheeled vehicles.

BACKGROUND OF THE INVENTION

Wheel chocks are wedge-shaped blocks that are placed against one or more of the wheels of a wheeled vehicle to restrain movement when the wheeled vehicle is parked. Although wheel chocks are rarely used on automobiles and trucks, they are frequently used to restrain the movement of aircraft parked on the ground. There are two basic reasons why wheel chocks are so commonly used for aircraft. First, most aircraft wheels do not contain brakes. Second, many types of aircraft are so light in weight that they can be moved by relatively small forces.

A variety of wheel chocks have been disclosed. The simplest wheel chocks sold commercially are two wedge-shaped members connected together with a rope. These wheel chocks are manually placed into position at the front and rear of a wheel. Other wheel chocks contain two wedge-shaped members connected together by a frame. Such wheel chocks are disclosed in Marsh, U.S. Pat. No. 2,771,162, issued Nov. 20, 1956; Rambat, U.S. Pat. No. 3,120,292, isued Feb. 4, 1964; Haynes, U.S. Pat. No. 3,811,536, issued May 21, 1974; Mountz, U.S. Pat. No. 4,711,325, issued Dec. 8, 1987; and Willaford, U.S. Pat. No. 5,437,210, issued Jun. 27, 1995. The major disadvantage of these wheel chocks is that they require the person positioning the wheel chock to bend down to ground level. Another disadvantage of these wheel chocks is that they provide little, if any, security against theft or unwanted removal unless some type of additional lock is used.

Accordingly, a demand exists for a wheel chock that can be moved into and out of position on a wheel by a user from a standing position and that provides improved security even without the use of an additional lock.

SUMMARY OF THE INVENTION

The general object of this invention is to provide an improved wheel chock. More particular objects are to provide a wheel chock that can be moved into position by a user from a standing position and that provides improved security even without the use of an additional lock.

I have invented such an improved wheel chock. The wheel chock comprises: (a) a first wheel-restraining member; (b) a frame attached to the first wheel-restraining member, the frame including a gear rack; (c) a second wheel-restraining member; (d) a gear assembly attached to the second wheel-restraining member, the gear assembly having a gear housing with an opening through which the frame passes, the gear assembly also having a pinion gear that engages the gear rack, the pinion gear being releasably ratcheting so that it can always be turned in a first direction to decrease the distance between the first and second wheel-restraining members but can be turned in a second direction to increase the distance between the first and second wheel-restraining members only when the ratcheting is released; and (e) an elongated handle member that engages the pinion gear to enable a user from a standing position to move the wheel chock along the ground, to turn the pinion gear in the first direction at any time, and to turn the pinion gear in the second direction when the ratcheting is released.

This wheel chock enables a user from a standing position and holding the handle member to restrain a wheel by moving the wheel chock into position on the wheel and then reducing the distance between the first and second wheel-restraining members so they touch the wheel, and to release the wheel by increasing the distance between the first and second wheel-restraining members and then removing the wheel chock. Security is improved because it is relatively difficult to remove the wheel chock, even without any type of additional lock, when the handle is removed.

DETAILED DESCRIPTION OF THE INVENTION

Figure 1:
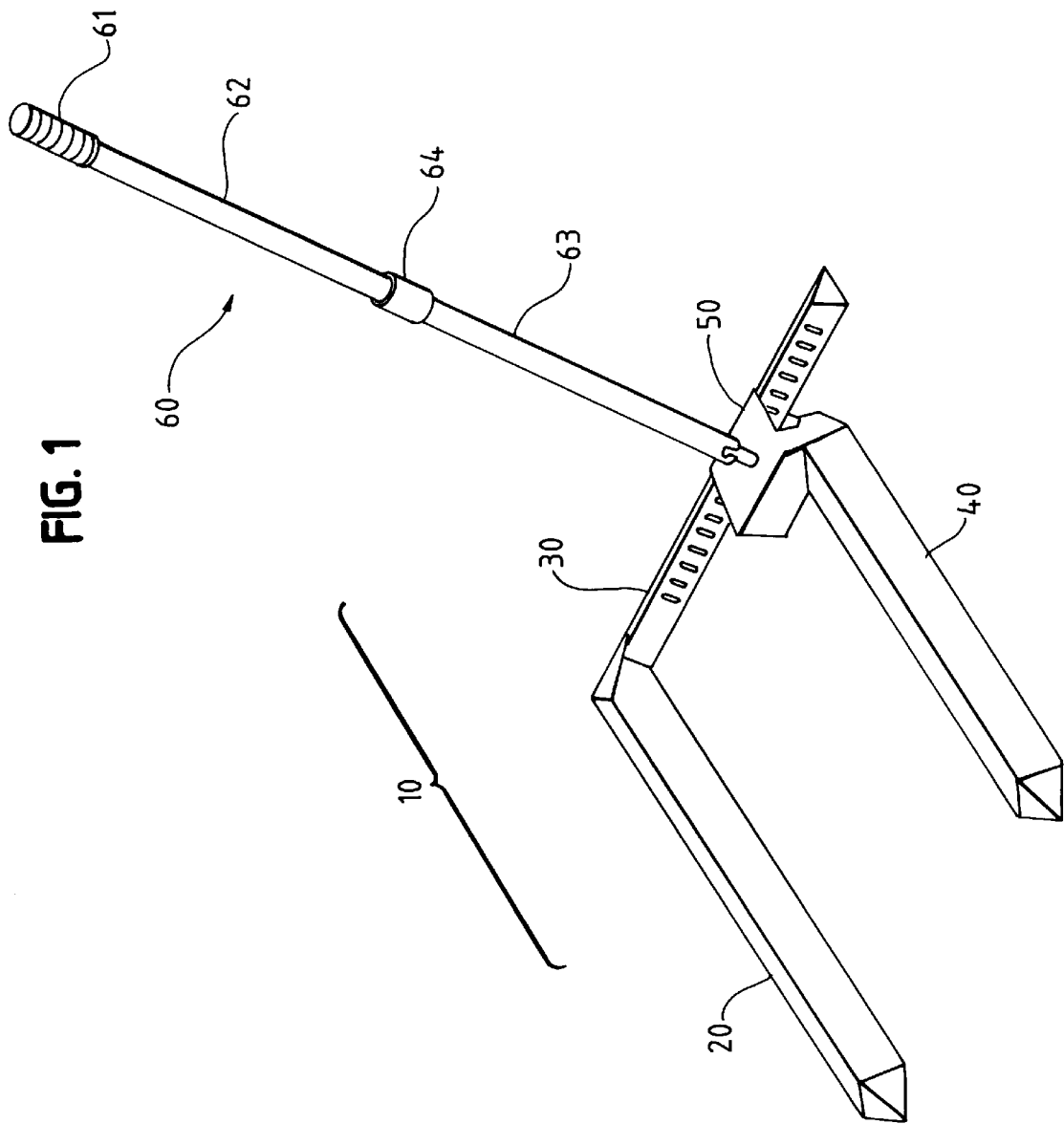
FIG. 1 is a top, side perspective view of the preferred embodiment of the wheel chock of this invention.

This invention is best understood by reference to the drawings. The preferred embodiment of the wheel chock 10 contains a first wheel-restraining member 20, a frame 30, a second wheel-restraining member 40, a gear assembly 50, and a handle 60. Each of these components is discussed in detail below.

The first and second wheel-restraining members 20 and 40 contact the front and rear of the wheel being restrained. The two wheel-restraining members are generally similar or identical in construction. Although square, rectangular, and other cross-sectional shapes are suitable, each wheel-restraining member is preferably wedge-shaped with a base and two slanting faces. The slanting of the face in contact with the wheel increases the surface area of contact and also reduces the chance of wheel movement by directing downward any force exerted by the wheel. If desired, the face in contact with the wheel is concave to more closely mate with the curve of the wheel as shown, for example, in Wokeck, U.S. Pat. No. 4,781,271, issued Nov. 1, 1988. However, the additional cost and complexity of manufacturing a concave surface generally offsets the marginal improvement in functioning.

The size of the wheel-restraining members is a matter of choice. The height of the wheel-restraining members is generally about one to three inches (3 to 8 cm) and the length is generally about six to sixteen inches (15 to 41 cm). The length is preferably about equal to the width of the wheel to be restrained. Lengths longer that the width of the wheel increase cost, size, and weight with little improvement in restraint. If desired, the second wheel-restraining member contains a ramp or pad which is placed under the wheel, as shown in Facemire, U.S. Pat. No. 3,858,690, issued Jan. 7, 1975. The weight of the wheel on the ramp provides additional restraint.

The material of construction of the wheel-restraining members is also a matter of choice. Other things being equal, the restraining ability of the wheel chock increases as the weight and coefficient of friction of the outside surface of the wheel-restraining members increase. However, for most uses, maximizing the amount of restraint is not needed and factors such as light weight and cost are more important. Accordingly, the preferred wheel-restraining members are hollow with an outside surface made of a strong material such as metal, plastic, or wood. The most preferred materials are aluminum and engineered plastics such as polycarbonate, polyvinylchloride (PVC), nylon, and the like. If additional strength or rigidity is desired, internal reinforcing ribs are included.

The frame 30 is connected to the first wheel-restraining member and extends perpendicularly from it to the second wheel-restraining member. The length of the frame determines the maximum distance between the wheel-restraining members. In the preferred embodiment, the frame is a wedge-shaped member similar in construction to the wheel-restraining members. This frame includes an integral gear rack 31 consisting of a series of indented teeth along much of the length of the frame. The gear rack, as will be seen, engages a pinion gear within the gear housing. The rotation of the pinion gear moves the gear rack and frame which, in turn, changes the distance between the wheel-restraining members. Other forms of the frame and gear rack are suitable, including, for example, a section of tubing made of PVC or the like with a series of holes drilled into it longitudinally, and metal gear rack attached to a separate frame element.

Figure 2:
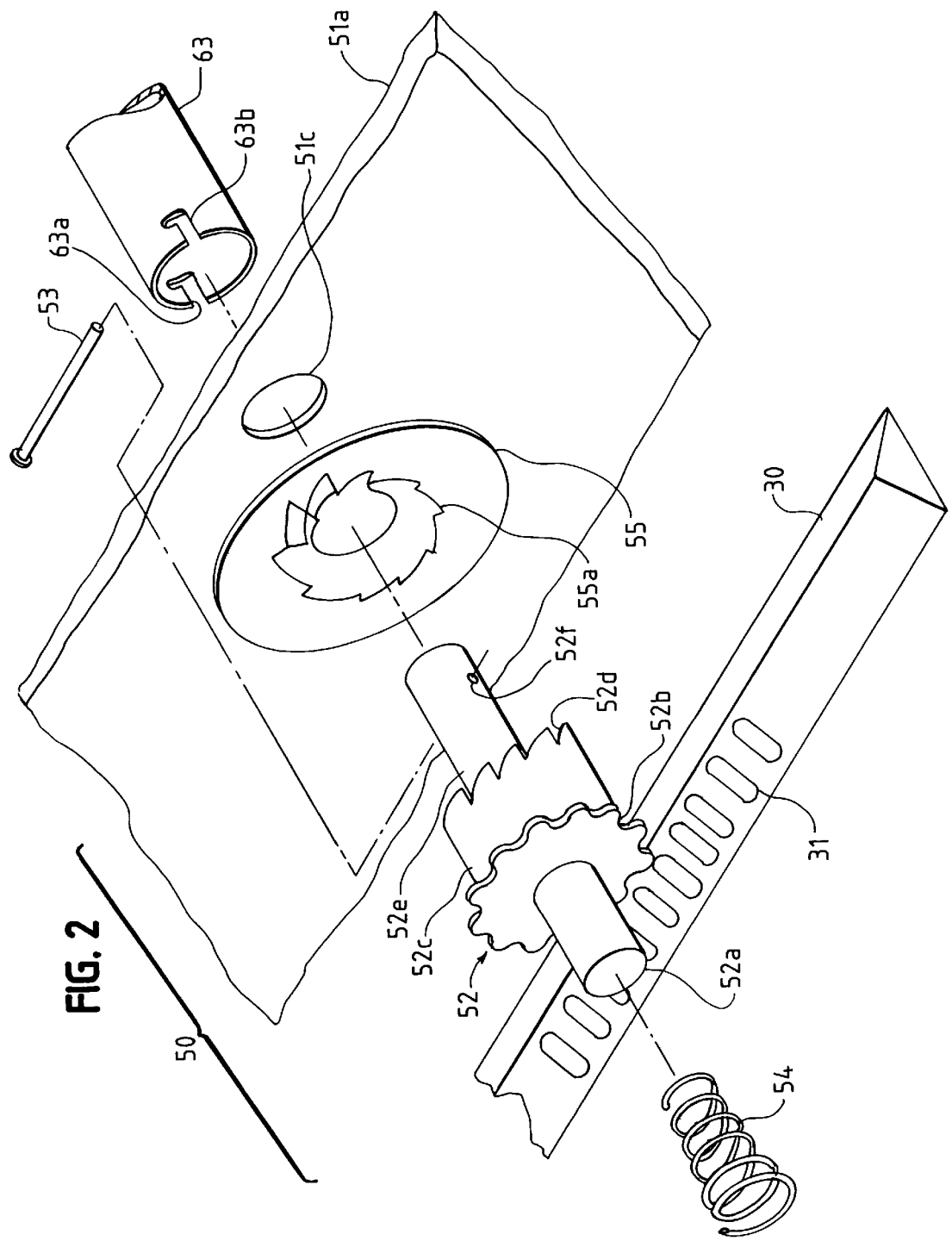
FIG. 2 is an exploded perspective view of the gear assembly of the wheel chock shown in FIG. 1.
Figure 3:
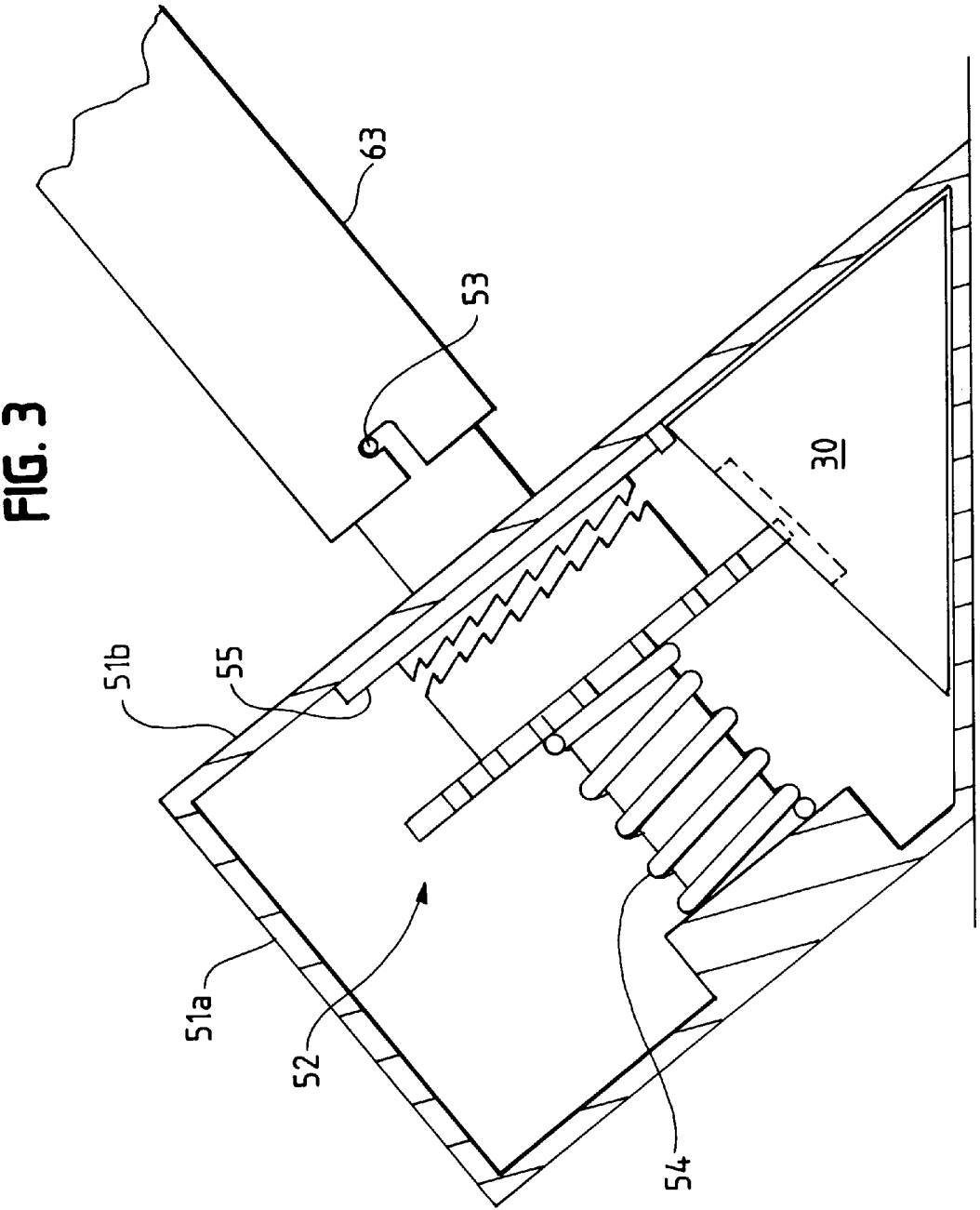
FIG. 3 is a partial sectional view of the gear assembly taken along line 3—3 of FIG. 1.

The gear assembly 50 is attached to the second wheel-restraining member. The gear assembly includes a gear housing 51 through which the frame passes. The gear housing consists of base 51a and cover 51b. The interior of the gear housing is shown in detail in FIGS. 2 and 3. A ratcheting pinion gear member 52 contains a lower shaft 52a, a pinion gear 52b that engages the gear rack of the frame, an extension 52c with sloping teeth 52d, and an upper shaft 52e with a hole 52f. The upper shaft extends through a hole 51c in the cover of the gear housing. A pin 53 passes through the hole in the upper shaft. A spring 54 fits over the lower shaft and is compressed between the base of the gear housing and the pinion gear. A plate 55 is attached to, or molded as part of, the interior of the gear housing cover. The plate contains sloping teeth 55a that mesh with the those of the ratcheting gear member. The ratcheting gear member and the plate are made of strong, wear-resistant materials such as metal and plastic. The preferred materials are nylon and polycarbonate because of their resistance to wear and resiliency.

The handle 60 is a tube having a length sufficient to enable it to reach the gear assembly and to be comfortably held by a user in a standing position. The length is generally about three feet (one meter). The handle is preferably made of plastic or metal tubing. The most preferred material is PVC. The handle preferably contains a hand grip 61 and is preferably made of an upper section 62 and a lower section 63 so it can be taken apart for ease of storage. In the preferred embodiment shown, a short section of tubing 64 whose inside diameter is just larger than the outside diameter of the two longer sections of tubing is attached to the upper section. The lower section is then inserted into the short section of tubing to connect the two handle sections. If desired, a set screw or other means is used to secure the two handle sections together. The lower end of the lower section contains two J-shaped notches 63a and 63b which are separated by 180 degrees. The notches engage the pin mounted in the upper shaft of the ratcheting gear member and provide the means by which the handle is connected to the rest of the wheel chock.

The operation of the wheel chock can now be considered. To restrain the wheel of a vehicle, the wheel chock is first assembled by connecting the two sections of handle and then engaging the handle to the gear assembly. If it is necessary to move the wheel-restraining members apart a sufficient distance to straddle the wheel, the handle is pushed downward and turned counter-clockwise (as viewed by the user looking toward the wheel chock). The downward force on the handle compresses the spring and moves the ratcheting gear member downward. The downward movement of the ratcheting gear member causes the sloping teeth to disengage. The pinion gear is then free to rotate counter-clockwise and to move the gear rack in the direction that separates the wheel-restraining members. The wheel chock is then pushed into position on the wheel with a wheel-restraining member at the front and back of the wheel. The handle is turned clockwise until the wheel-restraining members are both pressed tightly against the wheel. The handle is then removed. Movement of the wheel-restraining members is prevented and the wheel is restrained.

With the handle removed and the wheel-restraining members pressed tightly against the wheel, the wheel chock is difficult to remove. Accordingly, the wheel chock can be considered self-locking. Security against theft and unwanted removal is thus much better than with conventional wheel chocks. If additional security is needed, chains, cables, or the like can be attached to one or both of the wheel-restraining members using holes, brackets, or the like. The chain is then routed around the wheel and locked as shown, for example, in Willaford, U.S. Pat. No. 5,427,210, issued Jun. 27, 1995.

To remove the wheel chock, the handle is reattached. The handle is then pushed downward and rotated counter-clockwise to separate the wheel-restraining members. The wheel chock is then pulled back away from the wheel. Thus, a user from a standing position is able to quickly and easily restrain, and then release, one of the wheels of a wheeled vehicle.

I claim:

1. A wheel chock comprising:
   (a) a first wheel-restraining member;
   (b) a frame attached to the first wheel-restraining member, the frame including a gear rack;
   (c) a second wheel-restraining member;
   (d) a gear assembly attached to the second wheel-restraining member, the gear assembly having a gear housing with an opening through which the frame passes, the gear assembly also having a pinion gear that engages the gear rack, the pinion gear being releasably ratcheting so that it can always be turned in a first direction to decrease the distance between the first and second wheel-restraining members but can be turned in a second direction to increase the distance between the first and second wheel-restraining members only when the ratcheting is released; and
   (e) an elongated handle member that engages the pinion gear to enable a user from a standing position to move the wheel chock along the ground, to turn the pinion gear in the first direction at any time, and to turn the pinion gear in the second direction when the ratcheting is released;

so that a user from a standing position and holding the handle member can restrain a wheel by moving the wheel chock into position on the wheel and then reducing the distance between the first and second wheel-restraining members so they touch the wheel, and can release the wheel by increasing the distance between the first and second wheel-restraining members and then removing the wheel chock.

2. The wheel chock of claim 1 wherein the first and second wheel-restraining members are wedge-shaped.

3. The wheel chock of claim 2 wherein the gear rack comprises a series of indented teeth in the frame.

4. The wheel chock of claim 3 wherein the handle member is removable from the gear assembly.

5. A wheel chock comprising:
(a) a first wheel-restraining member;
(b) a frame attached to the first wheel-restraining member, the frame including a gear rack;
(c) a second wheel-restraining member;
(d) a gear assembly attached to the second wheel-restraining member, the gear assembly having a gear housing with an opening through which the frame passes, the gear assembly also having a pinion gear member that engages the gear rack, the pinion gear member having a releasably ratcheting means so that it can always be turned in a first direction to decrease the distance between the first and second wheel-restraining members but can be turned in a second direction to increase the distance between the first and second wheel-restraining members only when the ratcheting means is released; and
(e) an elongated handle member that engages the pinion gear member to enable a user from a standing position to move the wheel chock along the ground, to turn the pinion gear member in the first direction at any time, and to turn the pinion gear member in the second direction when the ratcheting means is released;
so that a user from a standing position and holding the handle member can restrain a wheel by moving the wheel chock into position on the wheel and then reducing the distance between the first and second wheel-restraining members so they touch the wheel, and can release the wheel by increasing the distance between the first and second wheel-restraining members and then removing the wheel chock.

6. The wheel chock of claim 5 wherein the first and second wheel-restraing members are wedge-shaped.

7. The wheel chock of claim 6 wherein the gear rack comprises a series of indented teeth in the frame.

8. The wheel chock of claim 7 wherein the releasably ratcheting means comprises a first set of sloping teeth on the pinion gear member, a second set of sloping teeth on the inside of the gear housing that mesh with the sloping teeth of the pinion gear member, and a spring that forces the first and second sets of sloping teeth together.

9. The wheel chock of claim 8 wherein the handle member is removable from the gear assembly.

10. The wheel chock of claim 9 wherein the handle member engages the gear assembly by means of J-shaped notches in the handle member and a transversely-mounted pin on the pinion gear member.

* * * * *